(12) United States Patent
Tsai et al.

(10) Patent No.: US 10,788,741 B2
(45) Date of Patent: Sep. 29, 2020

(54) PROJECTION DEVICE AND ILLUMINATION SYSTEM THEREOF

(71) Applicant: Coretronic Corporation, Hsin-Chu (TW)

(72) Inventors: Chih-Hsien Tsai, Hsin-Chu (TW); Yao-Shun Lin, Hsin-Chu (TW); Jo-Han Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/391,316

(22) Filed: Apr. 23, 2019

(65) Prior Publication Data

US 2019/0324358 A1 Oct. 24, 2019

(30) Foreign Application Priority Data

Apr. 24, 2018 (CN) .................... 2018 2 0593771 U
Oct. 29, 2018 (CN) .................... 2018 2 1757385 U

(51) Int. Cl.
*G03B 21/20* (2006.01)
*G02B 26/00* (2006.01)

(52) U.S. Cl.
CPC ......... *G03B 21/204* (2013.01); *G02B 26/008* (2013.01); *G03B 21/208* (2013.01); *G03B 21/2066* (2013.01)

(58) Field of Classification Search
CPC .......... G03B 21/204; G03B 21/2066; G03B 21/208; G03B 21/2033; G03B 21/2006; G03B 21/20; G03B 21/14; G03B 21/00; G02B 26/008; G02B 26/007; F21V 9/00; F21V 9/30; F21V 13/00; F21V 13/02; F21V 13/08; F21V 13/12; F21V 13/14

See application file for complete search history.

(56) References Cited

U.S. PATENT DOCUMENTS

2009/0316114 A1* 12/2009 Richards ............ G02B 27/0994
353/7
2012/0201030 A1* 8/2012 Yuan .................... H04N 9/3114
362/293

FOREIGN PATENT DOCUMENTS

| CN | 102721006 B | 3/2014 |
|----|-------------|--------|
| CN | 103292254 B | 5/2015 |
| CN | 103941532 B | 11/2015 |

\* cited by examiner

*Primary Examiner* — Bao Q Truong

(57) ABSTRACT

A projection device includes an illumination system, a light valve, and a projection lens. The illumination system includes an excitation light source, a wavelength conversion element, a light converging lens, and a light integration rod. The excitation light source provides an excitation beam. The wavelength conversion element converts the excitation beam into a conversion beam. A greatest width in a light spot formed on the wavelength conversion element by the excitation beam is a first distance. A greatest width in a light spot formed on the wavelength conversion element by the conversion beam is a second distance. The second distance is greater than the first distance. The light integration rod receives the conversion beam from the light converging lens. The conversion beam generated by the wavelength conversion element of the invention is effectively projected to the light integration rod.

22 Claims, 5 Drawing Sheets

PROJECTION DEVICE AND ILLUMINATION SYSTEM THEREOF

CROSS-REFERENCE TO RELATED APPLICATION

THIS APPLICATION CLAIMS THE PRIORITY BENEFIT OF CHINA APPLICATION (CN201820593771.X FILED ON 2018 Apr. 24) AND CHINA APPLICATION (CN201821757385.6 FILED ON 2018 Oct. 29). THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The invention relates to a projection device and an illumination system thereof, and more particularly to a projection device capable of effectively generating an illumination beam, and an illumination system thereof.

BACKGROUND OF THE INVENTION

A projection device is an apparatus that can project images onto a projection screen for presentation to users for viewing. The projection device will have an illumination system, which can produce uniform luminance, to provide an illumination beam required for projection. The illumination system of a general projection device configures a beam generated by a light source to be focused to a phosphor layer to generate a fluorescence beam for output. In order to achieve uniform output luminance, the illumination system is usually provided with a light integration rod, so that the fluorescence beam generated by the phosphor layer can be homogenized by the light integration rod to engender a suitable illumination beam.

However, due to the phosphor configuration and/or temperature of the phosphor layer, a light spot of the fluorescence beam generated by the phosphor layer will be greater than a light spot of the beam generated by the light source. Thus, a problem that the fluorescence beam cannot be effectively projected into the light integration rod will be engendered. Therefore, how to effectively project the fluorescence beam generated by the phosphor layer into the light integration rod is really the focus of attention of relevant personnel in the field.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a projection device, which can effectively project a conversion beam generated by a wavelength conversion element into a light integration rod.

The invention further provides an illumination system, which can effectively project a conversion beam generated by a wavelength conversion element into a light integration rod.

Other objectives and advantages of the invention can be further understood from the technical features disclosed in the invention.

In order to achieve one or a portion of or all of the objects or other objects, an embodiment of the invention provides a projection device, including an illumination system, a light valve, and a projection lens. The illumination system includes an excitation light source, a wavelength conversion element, a light converging lens, and a light integration rod. The excitation light source is used for providing an excitation beam. The wavelength conversion element is disposed on a transmission path of the excitation beam and is used for converting the excitation beam into a conversion beam. A greatest width in a light spot formed on the wavelength conversion element by the excitation beam is a first distance. A greatest width in a light spot formed on the wavelength conversion element by the conversion beam is a second distance. The second distance is greater than the first distance. The light converging lens is disposed on a transmission path of the conversion beam from the wavelength conversion element. A diameter of an effective light-receiving aperture of the light converging lens is a clear aperture CA. The clear aperture CA is more than twice the second distance. The light integration rod is disposed on a transmission path of the conversion beam and is used for receiving the conversion beam from the light converging lens. The light valve is disposed on a transmission path of the conversion beam and is used for receiving the conversion beam from the light integration rod and converting the conversion beam into an image beam. The projection lens is disposed on a transmission path of the image beam.

In order to achieve one or a portion of or all of the objects or other objects, an embodiment of the invention provides an illumination system, including an excitation light source, a wavelength conversion element, a light converging lens, and a light integration rod. The excitation light source is used for providing an excitation beam. The wavelength conversion element is disposed on a transmission path of the excitation beam and is used for converting the excitation beam into a conversion beam. A greatest width in a light spot formed on the wavelength conversion element by the excitation beam is a first distance. A greatest width in a light spot formed on the wavelength conversion element by the conversion beam is a second distance. The second distance is greater than the first distance. The light converging lens is disposed on a transmission path of the conversion beam from the wavelength conversion element. A diameter of an effective light-receiving aperture of the light converging lens is a clear aperture CA. The clear aperture CA is more than twice the second distance. The light integration rod is disposed on a transmission path of the conversion beam and is used for receiving the conversion beam from the light converging lens.

Since the illumination system of the projection device of the embodiments of the invention is provided with the light converging lens, and the clear aperture of the light converging lens is more than twice the greatest width in the light spot formed on the wavelength conversion element by the conversion beam, the conversion beam generated by the wavelength conversion element can be effectively received, so as to project the conversion beam into the light integration rod.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
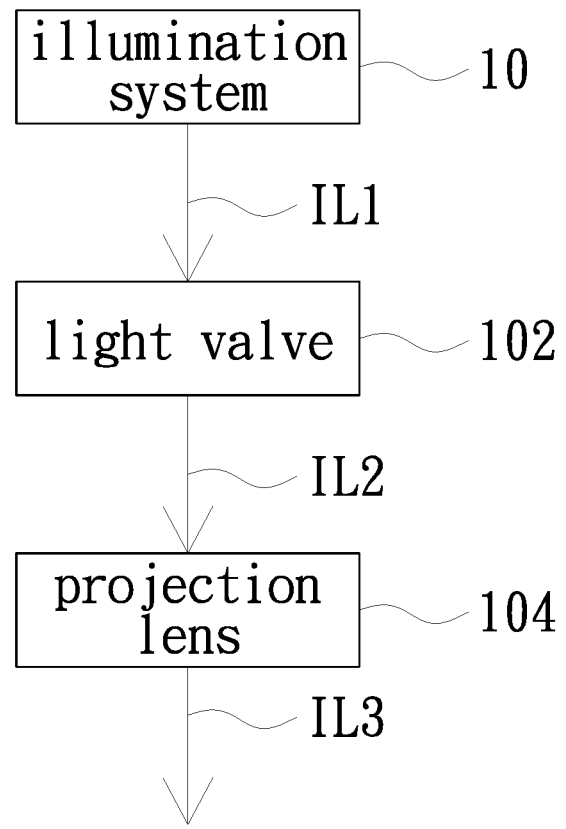
FIG. 1 is a schematic diagram of a projection device in accordance with an embodiment of the invention.

FIG. 1 is a schematic diagram of a projection device in accordance with an embodiment of the invention. Please refer to FIG. 1. A projection device 1 of the embodiment includes an illumination system 10, a light valve 102, and a projection lens 104. The light valve 102 is disposed on a transmission path of an illumination beam IL1 provided by the illumination system 10 and is used for converting the illumination beam IL1 into an image beam IL2. The projection lens 104 is disposed on a transmission path of the image beam IL2. The image beam IL2 is used for becoming a projection beam IL3 after passing through the projection lens 104, thereby forming image pictures on a projection surface. Although one light valve 102 is taken as an example in FIG. 1, in other embodiments, the number of the light valve 102 may also be more than one. In addition, the light valve 102 of the embodiment is exemplified by a transmissive light valve (for example, a transmissive liquid crystal panel), and the invention is not limited thereto. In other embodiments, the light valve 102 may also adopt a reflective light valve, such as a reflective liquid crystal panel, a digital micro-mirror device (DMD) or a liquid crystal on silicon panel (LCoS Panel), and the types and positions of accompanying optical elements may be adjusted appropriately.

Figure 2:
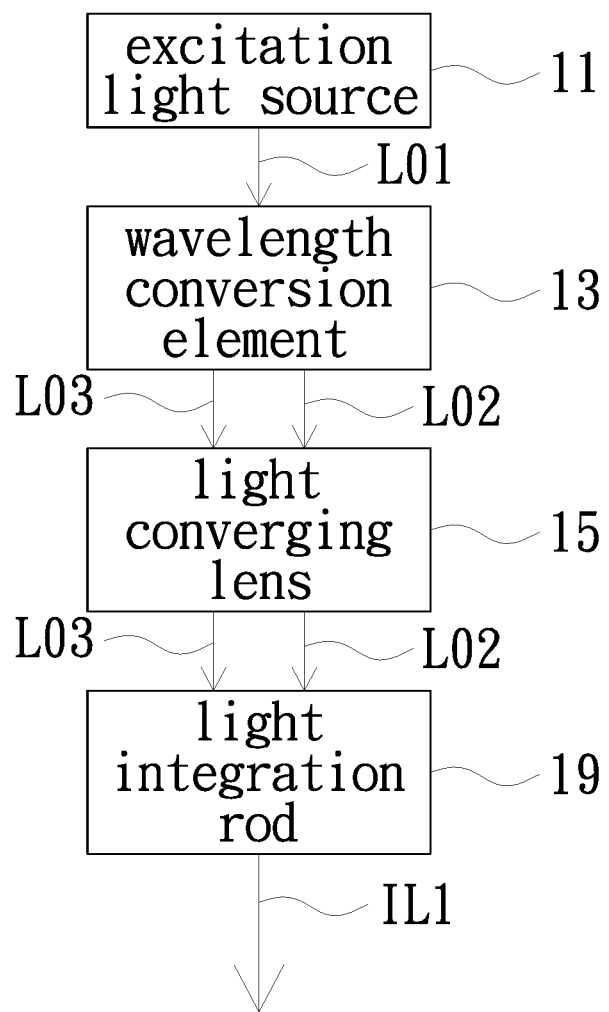
FIG. 2 is a schematic block diagram of an illumination system in accordance with an embodiment of the invention.

FIG. 2 is a schematic block diagram of an illumination system in accordance with an embodiment of the invention. Please refer to FIG. 2. In the embodiment, the illumination system 10 includes an excitation light source 11, a wavelength conversion element 13, a light converging lens 15, and a light integration rod 19. In the embodiment, the excitation light source 11 is used for providing an excitation beam L01. A light source used by the excitation light source 11 is, for example, a laser diode (LD) or a laser diode array (a blue laser diode bank). Alternatively, the light source used by the excitation light source 11 may also be a light emitting diode (LED) or an organic light-emitting diode (OLED). Specifically, all light sources that meet the requirements in actual design may be implemented, and the invention is not limited thereto. The wavelength conversion element 13 is disposed on a transmission path of the excitation beam L01, and is used for converting a first portion of the excitation beam L01 into a conversion beam L02. In the embodiment, the light converging lens 15 is disposed on transmission paths of the conversion beam L02 from the wavelength conversion element 13 and a second portion L03 of the excitation beam L01, so that the conversion beam L02 and the second portion L03 of the excitation beam L01 are transmitted to the light integration rod 19 and constitute the illumination beam IL1.

Figure 3:
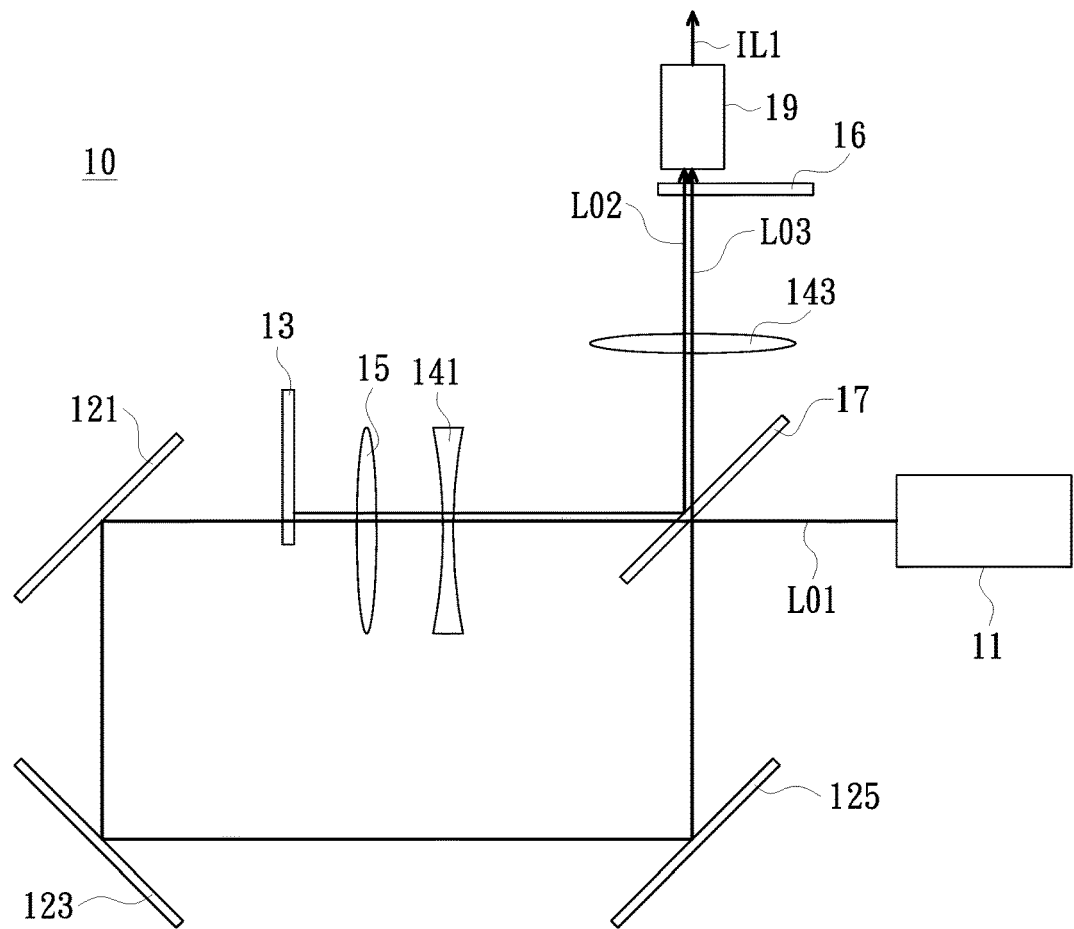
FIG. 3 is a schematic diagram of an illumination system in accordance with an embodiment of the invention.

FIG. 3 is a schematic diagram of an illumination system in accordance with an embodiment of the invention. Please refer to FIG. 3. The illumination system 10 of the embodiment includes an excitation light source 11, a wavelength conversion element 13, a light converging lens 15, and a light integration rod 19. The excitation light source 11 is used for providing an excitation beam L01. The wavelength conversion element 13 is disposed on a transmission path of the excitation beam L01 and is used for converting a first portion of the excitation beam L01 into a conversion beam L02. The light converging lens 15 is disposed on a transmission path of the conversion beam L02 from the wavelength conversion element 13. The light integration rod 19 is disposed on a transmission path of the conversion beam L02 and is used for receiving the conversion beam L02 from the light converging lens 15.

Figure 4:
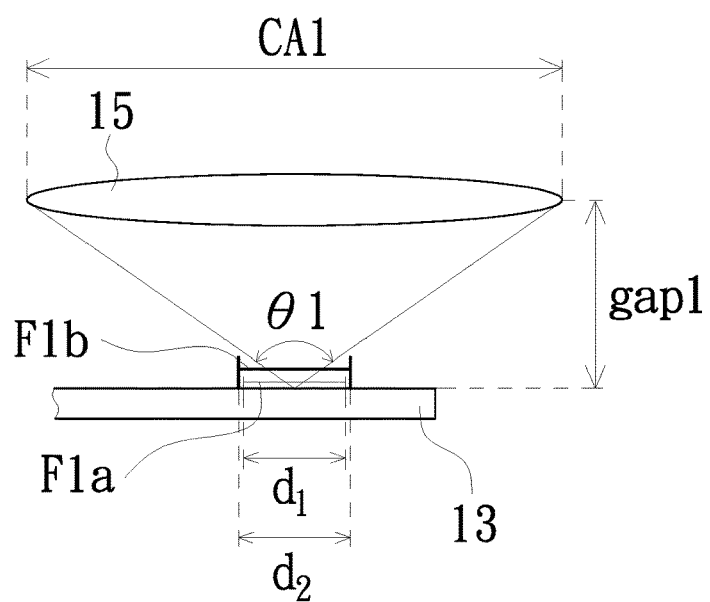
FIG. 4 is a schematic diagram of light spots formed on a wavelength conversion element of FIG. 3.

Please also refer to FIG. 4. FIG. 4 is a schematic diagram of light spots formed on the wavelength conversion element 13 of the illumination system 10 shown in FIG. 3. In the embodiment, a greatest width in a light spot F1a formed by the first portion of the excitation beam L01 incident on the wavelength conversion element 13 is a first distance d1. A greatest width in a light spot F1b formed on the wavelength conversion element 13 by the conversion beam L02 before emerging from the wavelength conversion element 13 is a second distance d2. The second distance d2 is greater than the first distance d1. A diameter of an effective light-receiving aperture of the light converging lens 15 is a clear aperture CA1 The clear aperture CA1 is more than twice the second distance d2. Through the disposition of the light converging lens 15 in which the clear aperture CA1 is more than twice the second distance d2, the illumination system 10 of the embodiment can effectively project the conversion beam L02 generated by the wavelength conversion element 13 into the light integration rod 19.

In detail, there is a spacing gap1 between the light converging lens 15 and the wavelength conversion element 13. The light converging lens 15 has a light receiving angle θ1 for receiving the conversion beam L02, wherein $\theta 1 = 2\tan^{-1}(CA1/2gap1)$, and θ1>150°. Through the disposition of the light converging lens 15 with a clear aperture CA1, and adjusting the spacing gap1 to make a light receiving angle θ1>150°, the illumination system 10 can effectively project the conversion beam L02 generated by the wavelength conversion element 13 into the light integration rod 19. In the embodiment, since the excitation light source 11 may be of different kinds or types, the excitation beam L01 can form different light spots on the wavelength conversion element 13, such as a circular shape, an elliptical shape or an irregular shape, etc. The conversion beam L02 can also form different light spots on the wavelength conversion element 13. In different light spots, the first distance d1 is defined as a greatest width in a light spot F1a, and the second distance d2 is defined as a greatest width in a light spot F1b.

Figure 5:
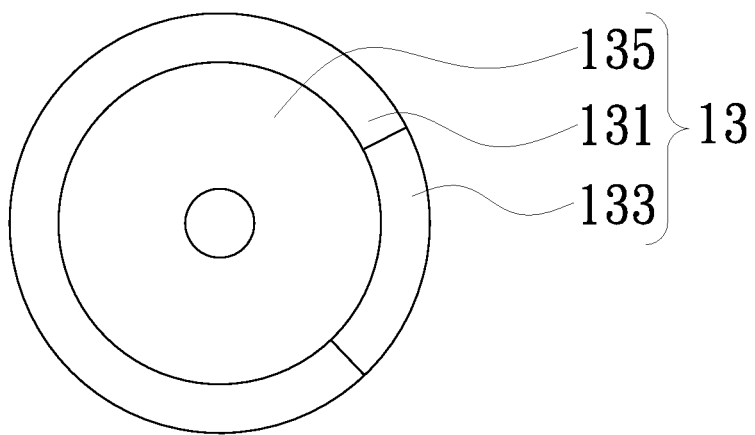
FIG. 5 is a schematic diagram of the wavelength conversion element of FIG. 3.

Please also refer to FIG. 5. FIG. 5 is a schematic diagram of the wavelength conversion element of FIG. 3. In the embodiment, the illumination system 10 further includes a dichroic element 17. The dichroic element 17 is disposed between the excitation light source 11 and the light converging lens 15 and is used for configuring the excitation beam L01 from the excitation light source 11 to pass therethrough to the light converging lens 15. The light converging lens 15 converges the excitation beam L01 to the wavelength conversion element 13. The wavelength conversion element 13 has a reflective wavelength conversion portion 131 and a light-transmissive portion 133. The reflective wavelength conversion portion 131 of the wavelength conversion element 13 is used for converting the first portion of the excitation beam L01 into the conversion beam L02 and for reflecting the conversion beam L02 to the light converging lens 15. The light-transmissive portion 133 of the wavelength conversion element 13 is used for configuring the second portion L03 of the excitation beam L01 from the light converging lens 15 to pass therethrough. The dichroic element 17 is also used for reflecting the conversion beam L02 from the light converging lens 15, so as to project the conversion beam L02 to the light integration rod 19.

In detail, the illumination system 10 may further include a light transmission module. The light transmission module is disposed on a transmission path of the second portion L03 of the excitation beam L01 passing through the light-transmissive portion 133, and is used for transmitting the second portion L03 of the excitation beam L01, which passes through the light-transmissive portion 133 of the wavelength conversion element 13, back to the dichroic element 17. The dichroic element 17 allows the second portion L03 of the excitation beam L01 to pass therethrough and to be projected to the light integration rod 19. Therefore, in the embodiment, the conversion beam L02 and the second portion L03 of the excitation beam L01 can be transmitted to the light integration rod 19 to constitute the illumination beam IL1 through the disposition of the dichroic element 17 and the light transmission module. The light valve 102 receives the illumination beam IL1 transmitted via the light integration rod 19 and converts the illumination beam IL1 into the image beam IL2.

As shown in FIG. 3, the light transmission module may, for example, include a first reflective element 121, a second reflective element 123, and a third reflective element 125. The first reflective element 121 is disposed on a transmission path of the second portion L03 of the excitation beam L01, and is used for reflecting the second portion L03 of the excitation beam L01, which passes through the light-transmissive portion 133, to the second reflective element 123. The second reflective element 123 is used for reflecting the second portion L03 of the excitation beam L01 to the third reflective element 125. The third reflective element 125 is used for reflecting the second portion L03 of the excitation beam L01 to the dichroic element 17. The light transmission module shown in FIG. 3 is only an example, and is not intended to limit the invention. Specifically, the wavelength conversion element 13 is, for example, a phosphor wheel, and includes a disk plate 135 and a motor (not shown in the figure) that drives the disk plate 135 to rotate. In the embodiment, the reflective wavelength conversion portion 131 is disposed on the disk plate 135. The disk plate 135 has the light-transmissive portion 133. The light-transmissive portion 133 is, for example, an opening or a light-transmissive diffusion element provided on the disk plate 135, and the invention is not limited thereto. In the embodiment, the reflective wavelength conversion portion 131 has a phosphor. The phosphor is, for example, a yellow phosphor that can generate a yellow conversion beam by excitation, but is not limited thereto. In other embodiments, the reflective wavelength conversion portion 131 may also have a plurality of areas to dispose a plurality of phosphors respectively, such as a yellow phosphor that can generate a yellow conversion beam by excitation and a green phosphor that can generate a green conversion beam by excitation. In the embodiment, with the rotation of the disk plate 135, the excitation beam L01 can alternately irradiate the reflective wavelength conversion portion 131 and the light-transmissive portion 133. The first portion of the excitation beam L01 refers to the excitation beam irradiating the reflective wavelength conversion portion 131. The second portion L03 of the excitation beam L01 refers to the excitation beam irradiating the light-transmissive portion 133. More specifically, in the embodiment, when the reflective wavelength conversion portion 131 rotates to a position on a transmission path of the excitation beam L01, the excitation beam L01 irradiating the reflective wavelength conversion portion 131 at this time is the first portion of the excitation beam L01 which is converted into the conversion beam L02 by the reflective wavelength conversion portion 131. On the other hand, in the embodiment, when the light-transmissive portion 133 rotates to a position on a transmission path of the excitation beam L01, the excitation beam L01 irradiating the light-transmissive portion 133 at this time is the second portion L03 of the excitation beam L01 which passes through the light-transmissive portion 133. Specifically, the first portion of the excitation beam and the second portion of the excitation beam do not mean that the excitation beam includes two kinds of light beams or two light beams. It means that the same excitation beam L01 coming from the excitation light source 11 irradiates the wavelength conversion element 13 in different periods, respectively. For example, the same excitation beam L01 irradiates the reflective wavelength conversion portion and the light-transmissive portion in different periods, respectively. For convenient description, the excitation beam irradiating the wavelength conversion element 13 in different periods represents the first portion of the excitation beam and the second portion of the excitation beam. Briefly, the first portion of the excitation beam represents the excitation beam L01 irradiating the reflective wavelength conversion portion. When the light-transmissive portion 133 rotates to a position on a transmission path of the excitation beam L01, the excitation beam L01 passes through the light-transmissive portion 133. Therefore, the second portion L03 of the excitation beam L01 represents the excitation beam L01 passing through the light-transmissive portion 133.

FIG. 4 shows light spots formed on the reflective wavelength conversion portion 131 of the wavelength conversion element 13 by the excitation beam L01 and the conversion beam L02.

Incidentally, due to the influence of the phosphor configuration and/or temperature of the wavelength conversion element 13, the light spot F1b formed on the wavelength conversion element 13 by the conversion beam L02 is greater than the light spot F1a formed by the first portion of the excitation beam L01, but the invention is not limited thereto.

Bearing the above, please refer to FIG. 3 and FIG. 5. In the embodiment, the reflective wavelength conversion portion 131 is used for converting the corresponding first portion of the excitation beam L01 into the conversion beam L02 and for reflecting the conversion beam L02. The light-transmissive portion 133 is used for configuring the corresponding second portion L03 of the excitation beam L01 to pass therethrough. In the embodiment, when the motor drives the disk plate 135 to rotate, the excitation beam L01 provided by the excitation light source 11 alternately irradiates the reflective wavelength conversion portion 131 and the light-transmissive portion 133. The reflective wavelength conversion portion 131 configures the excitation beam L01 to excite the phosphor to generate the conversion beam L02 and reflects the conversion beam L02. The light-transmissive portion 133 configures the second portion L03 of the excitation beam L01 to pass therethrough. Specifically, in the embodiment, the reflective wavelength conversion portion 131 may be further provided with a reflective layer or a reflective coating layer (not shown in the figure). The phosphor is disposed on the reflective layer or the reflective coating layer to reflect the light generated by the phosphor and to enhance the utilization rate of the reflected conversion beam L02, but the invention is not limited thereto. The excitation beam L01 of the embodiment is, for example, a blue beam. The conversion beam L02 is, for example, a yellow beam. However, the invention is not limited thereto. In an embodiment, the blue beam is, for example, a beam of 420-470 nanometers (nm), but the invention is not limited thereto.

In detail, the illumination system 10 may further include a first lens 141. The first lens 141 is disposed on light paths between the light converging lens 15 and the light integration rod 19, so that the conversion beam L02 from the light converging lens 15 becomes a collimation beam after being projected by the first lens 141. In the embodiment, the first lens 141 is illustrated as being disposed between the light converging lens 15 and the dichroic element 17 as an example, but the invention is not limited thereto.

In addition, the illumination system 10 may further include a second lens 143. The second lens 143 is disposed on light paths between the light integration rod 19 and the first lens 141, so that the conversion beam L02 projected by the first lens 141 is projected to the light integration rod 19 via the second lens 143. In the embodiment, the second lens 143 is illustrated as being disposed between the light integration rod 19 and the dichroic element 17 as an example, but the invention is not limited thereto. Through the disposition of the first lens 141 and/or the second lens 143, the conversion beam L02 can be more efficiently projected into the light integration rod 19.

In addition, in the embodiment, the illumination system 10 may, for example, further include a color wheel 16. The color wheel 16 is disposed between the light integration rod 19 and the dichroic element 17. In the embodiment, the color wheel 16 is, for example, a filter wheel for filtering light beams, so that the beams of different colors passing through the color wheel 16 are more pure in color. In the embodiment, the conversion beam L02 and the second portion L03 of the excitation beam L01 from the dichroic element 17 are filtered by the color wheel 16 and then homogenized by the light integration rod 19 to generate the illumination beam IL1. In the embodiment, the light integration rod 19 may, for example, be a hollow light integration rod or a solid light integration rod, and the invention is not limited thereto.

In the embodiment, the dichroic element 17 may be a dichroic element (for example, a dichroic mirror) or a transflective element (for example, a half mirror), depending on the colors of the excitation beam L01 and the conversion beam L02.

Figure 6:
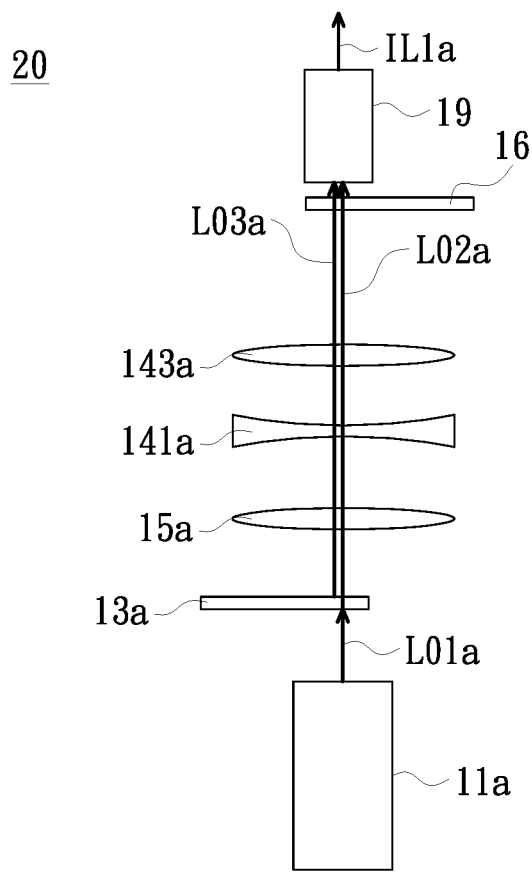
FIG. 6 is a schematic diagram of an illumination system in accordance with another embodiment of the invention.

FIG. 6 is a schematic diagram of an illumination system in accordance with another embodiment of the invention. Please refer to FIG. 6. An illumination system 20 of the embodiment includes an excitation light source 11a, a wavelength conversion element 13a, a light converging lens 15a, and a light integration rod 19. The excitation light source 11a is used for providing an excitation beam L01a. The wavelength conversion element 13a is disposed on a transmission path of the excitation beam L01a and is used for converting a first portion of the excitation beam L01a into a conversion beam L02a. The light converging lens 15a is disposed on a transmission path of the conversion beam L02a from the wavelength conversion element 13a. The light integration rod 19 is disposed on a transmission path of the conversion beam L02a and is used for receiving the conversion beam L02a from the light converging lens 15a.

Figure 7:
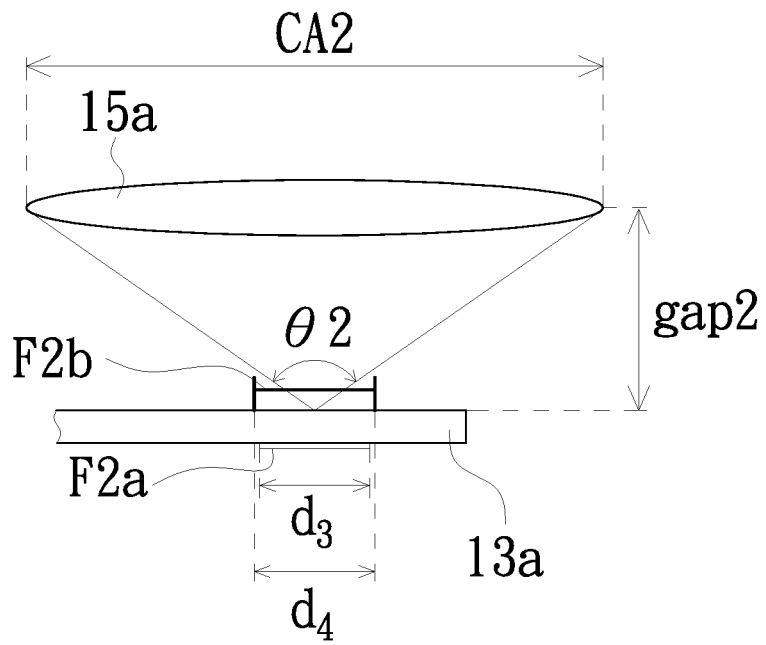
FIG. 7 is a schematic diagram of light spots formed on a wavelength conversion element of FIG. 6.

Please also refer to FIG. 7. FIG. 7 is a schematic diagram of light spots formed on the wavelength conversion element 13a of the illumination system 20 shown in FIG. 6. In the embodiment, a greatest width in a light spot F2a, formed by the first portion of the excitation beam L01a incident on the wavelength conversion element 13a, is a first distance d3. A greatest width in a light spot F2b, formed on the wavelength conversion element 13a by the conversion beam L02a before emerging from the wavelength conversion element 13a, is a second distance d4. The second distance d4 is greater than the first distance d3. A diameter of an effective light-receiving aperture of the light converging lens 15a is a clear aperture CA2. The clear aperture CA2 is more than twice the second distance d4. Through the disposition of the light converging lens 15a in which the clear aperture CA2 is more than twice the second distance d4, the illumination system 20 of the embodiment can effectively project the conversion beam L02a generated by the wavelength conversion element 13a to the light integration rod 19.

In detail, there is a spacing gap2 between the light converging lens 15a and the wavelength conversion element 13a. The light converging lens 15a has a light receiving angle θ2 for receiving the conversion beam L02a, wherein θ2=2 tan$^{-1}$ (CA2/2gap2), and θ2>150°. Through the disposition of the light converging lens 15a with a clear aperture CA2, and adjusting the spacing gap2 to make a light receiving angle θ2>150°, the illumination system 20 can effectively project the conversion beam L02a generated by the wavelength conversion element 13a into the light integration rod 19.

Figure 8:
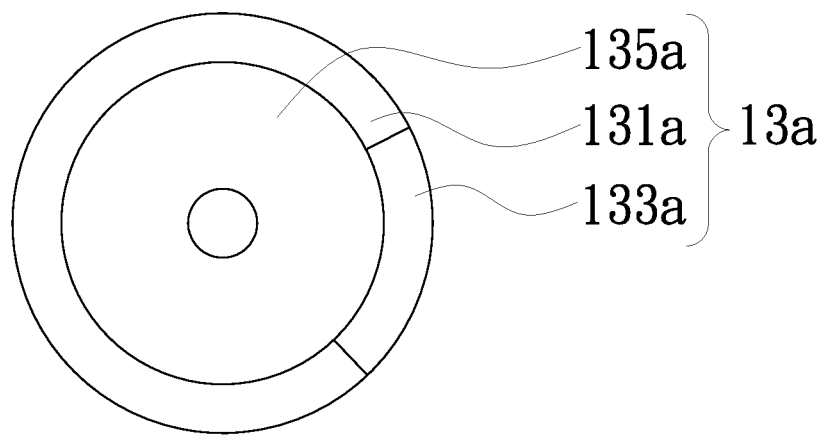
FIG. 8 is a schematic diagram of the wavelength conversion element of FIG. 6.

FIG. 8 is a schematic diagram of the wavelength conversion element 13a of FIG. 6. As shown in FIG. 8, in the embodiment, the wavelength conversion element 13a of the illumination system 20 has a transmissive wavelength conversion portion 131a and a light-transmissive portion 133a. The transmissive wavelength conversion portion 131a of the wavelength conversion element 13a is used for converting the first portion of the excitation beam L01a into the conversion beam L02a and for configuring the conversion beam L02a to pass therethrough to be transmitted to the light converging lens 15a. The light-transmissive portion 133a of the wavelength conversion element 13a is used for configuring a second portion L03a of the excitation beam L01a to pass therethrough to be transmitted to the light converging lens 15a. The light converging lens 15a projects the conversion beam L02a and the second portion L03a of the excitation beam L01a to the light integration rod 19. When the illumination system 20 is applied to the projection device 1 shown in FIG. 1, the light valve 102 receives the conversion beam L02a and the second portion L03a of the excitation beam L01a transmitted via the light integration rod 19, and converts the conversion beam L02a and the second portion L03a of the excitation beam L01a into the image beam IL2.

In detail, in the embodiment, the wavelength conversion element 13a is, for example, a phosphor wheel, and includes a disk plate 135a and a motor (not shown in the figure) that drives the disk plate 135a to rotate. In the embodiment, the transmissive wavelength conversion portion 131a is disposed on the disk plate 135a and includes a phosphor. The phosphor is, for example, a yellow phosphor that can generate a yellow conversion beam by excitation, but is not limited thereto. In other embodiments, the transmissive wavelength conversion portion 131a may also have a plurality of areas to dispose a plurality of phosphors of different colors respectively. The disk plate 135a may have the transmissive wavelength conversion portion 131a, used for converting the corresponding first portion of the excitation beam L01a into the conversion beam L02a and for allowing the conversion beam L02a to pass therethrough to be transmitted to the light converging lens 15a. The light-transmissive portion 133a is used for configuring the corresponding second portion L03a of the excitation beam L01a to pass therethrough to be transmitted to the light converging lens 15a. In the embodiment, when the motor drives the disk plate 135a to rotate, the excitation beam L01a provided by the excitation light source 11a can alternately irradiate the transmissive wavelength conversion portion 131a and the light-transmissive portion 133a, so that the excitation beam L01a excites the phosphor to generate the conversion beam L02a. The conversion beam L02a passes through the transmissive wavelength conversion portion 131a, and the second portion L03a of the excitation beam L01a passes through the light-transmissive portion 133a.

The excitation beam L01a of the embodiment is, for example, a blue beam, and the conversion beam L02a is, for example, a yellow beam, but are not limited thereto. FIG. 7 shows light spots formed on the transmissive wavelength conversion portion 131a of the wavelength conversion element 13a by the excitation beam L01a and the conversion beam L02a. Incidentally, due to the influence of the phosphor configuration and/or temperature of the wavelength conversion element 13a, the light spot F2b formed on the wavelength conversion element 13a by the conversion beam L02a is greater than the light spot F2a formed by the first portion of the excitation beam L01a, but the invention is not limited thereto.

In addition, the illumination system 20 may further include a color wheel 16, disposed between the light integration rod 19 and the light converging lens 15a. The conversion beam L02a and the second portion L03a of the excitation beam L01a are filtered by the color wheel 16 and then homogenized by the light integration rod 19 to generate an illumination beam IL1a.

In detail, the illumination system 20 may further include a first lens 141a. The first lens 141a is disposed on light paths between the light converging lens 15a and the light integration rod 19, so that the conversion beam L02a from the light converging lens 15a becomes a collimation beam after being projected by the first lens 141a.

In addition, the illumination system 20 may further include a second lens 143a. The second lens 143a is disposed on light paths between the light integration rod 19 and the first lens 141a, so that the conversion beam L02a projected by the first lens 141a is projected to the light integration rod 19 via the second lens 143a. Through the disposition of the first lens 141a and/or the second lens 143a, the conversion beam L02a can be more efficiently projected into the light integration rod 19.

In one embodiment, optical elements such as the dichroic element or the lens described above may be formed by a spherical lens or/and a plated film, etc., depending on actual needs, but the invention is not limited thereto.

In summary, since the illumination system of the projection device of the embodiments of the invention is provided with the light converging lens, and the clear aperture of the light converging lens is more than twice the greatest width in the light spot formed on the wavelength conversion element by the conversion beam, the conversion beam generated by the wavelength conversion element can be effectively received, so as to project the conversion beam into the light integration rod to reduce optical loss.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first reflective element, the second reflective element, the third reflective element, the first lens, the second lens, the first distance, the second distance, the first portion, and the second portion are only used for distinguishing various elements and do not limit the number of the elements.

What is claimed is:

1. A projection device, comprising:
an illumination system, comprising:
an excitation light source, used for providing an excitation beam;
a wavelength conversion element, disposed on a transmission path of the excitation beam and used for converting the excitation beam into a conversion beam, wherein a greatest width in a light spot formed on the wavelength conversion element by the excitation beam is a first distance, a greatest width in a light spot formed on the wavelength conversion element by the conversion beam is a second distance, and the second distance is greater than the first distance;
a light converging lens, disposed on a transmission path of the conversion beam from the wavelength conversion element, wherein a diameter of an effective light-receiving aperture of the light converging lens is a clear aperture CA, and the clear aperture CA is more than twice the second distance; and
a light integration rod, disposed on a transmission path of the conversion beam and used for receiving the conversion beam from the light converging lens;
a light valve, disposed on a transmission path of the conversion beam and used for receiving the conversion beam from the light integration rod and converting the conversion beam into an image beam; and
a projection lens, disposed on a transmission path of the image beam.

2. The projection device of claim 1, wherein there is a spacing gap between the light converging lens and the wavelength conversion element, the light converging lens has a light receiving angle θ for receiving the conversion beam, and θ=2 tan$^{-1}$ (CA/2gap), θ>150°.

3. The projection device of claim 1, wherein the illumination system further comprises a dichroic element disposed between the excitation light source and the light converging lens and used for configuring the excitation beam from the excitation light source to pass therethrough to the light converging lens, the light converging lens projects the excitation beam to the wavelength conversion element, the wavelength conversion element has a reflective wavelength conversion portion and a light-transmissive portion, the reflective wavelength conversion portion is used for converting the excitation beam into the conversion beam and for reflecting the conversion beam to the light converging lens, the light-transmissive portion is used for configuring the excitation beam to pass therethrough, and the dichroic element is also used for reflecting the conversion beam from the light converging lens so as to project the conversion beam to the light integration rod.

4. The projection device of claim 3, wherein the illumination system further comprises a light transmission module, the light transmission module is disposed on a transmission path of the excitation beam and is used for transmitting the excitation beam passing through the light-transmissive portion back to the dichroic element, the dichroic element allows the excitation beam to pass therethrough and to be projected to the light integration rod, and the light valve receives the conversion beam and the excitation beam transmitted via the light integration rod and converts the conversion beam and the excitation beam into the image beam.

5. The projection device of claim 3, wherein the illumination system further comprises a color wheel disposed between the light integration rod and the dichroic element.

6. The projection device of claim 3, wherein the illumination system further comprises a first lens disposed between the light converging lens and the dichroic element, and the conversion beam from the light converging lens becomes a collimation beam after being projected by the first lens.

7. The projection device of claim 6, wherein the illumination system further comprises a second lens disposed between the light integration rod and the dichroic element, and the conversion beam reflected by the dichroic element is projected by the second lens to the light integration rod.

8. The projection device of claim 1, wherein the wavelength conversion element has a transmissive wavelength conversion portion and a light-transmissive portion, the transmissive wavelength conversion portion is used for converting the excitation beam into the conversion beam and for configuring the conversion beam to pass therethrough to be transmitted to the light converging lens, the light-transmissive portion is used for configuring the excitation beam to pass therethrough to be transmitted to the light converging lens, the light converging lens projects the conversion beam and the excitation beam to the light integration rod, and the light valve receives the conversion beam and the excitation beam transmitted via the light integration rod and converts the conversion beam and the excitation beam into the image beam.

9. The projection device of claim 8, wherein the illumination system further comprises a color wheel disposed between the light integration rod and the light converging lens.

10. The projection device of claim 8, wherein the illumination system further comprises a first lens disposed on light paths between the light converging lens and the light integration rod, and the conversion beam from the light converging lens becomes a collimation beam after being projected by the first lens.

11. The projection device of claim 10, wherein the illumination system further comprises a second lens disposed between the light integration rod and the first lens, and the conversion beam projected by the first lens is projected to the light integration rod via the second lens.

12. An illumination system, comprising:
an excitation light source, used for providing an excitation beam;
a wavelength conversion element, disposed on a transmission path of the excitation beam and used for converting the excitation beam into a conversion beam, wherein a greatest width in a light spot formed on the wavelength conversion element by the excitation beam is a first distance, and a greatest width in a light spot formed on the wavelength conversion element by the conversion beam is a second distance, and the second distance is greater than the first distance;
a light converging lens, disposed on a transmission path of the conversion beam from the wavelength conversion element, wherein a diameter of an effective light-receiving aperture of the light converging lens is a clear aperture CA, and the clear aperture CA is more than twice the second distance; and
a light integration rod, disposed on a transmission path of the conversion beam and used for receiving the conversion beam from the light converging lens.

13. The illumination system of claim 12, wherein there is a spacing gap between the light converging lens and the wavelength conversion element, the light converging lens has a light receiving angle θ for receiving the conversion beam, and $\theta = 2\tan^{-1}(CA/2gap)$, $\theta > 150°$.

14. The illumination system of claim 12, further comprising a dichroic element disposed between the excitation light source and the light converging lens and used for configuring the excitation beam from the excitation light source to pass therethrough to the light converging lens, wherein the light converging lens projects the excitation beam to the wavelength conversion element, the wavelength conversion element has a reflective wavelength conversion portion and a light-transmissive portion, the reflective wavelength conversion portion is used for converting the excitation beam into the conversion beam and for reflecting the conversion beam to the light converging lens, the light-transmissive portion is used for configuring the excitation beam to pass therethrough, and the dichroic element is used for reflecting the conversion beam from the light converging lens so as to project the conversion beam to the light integration rod.

15. The illumination system of claim 14, further comprising a light transmission module, wherein the light transmission module is disposed on a transmission path of the excitation beam and is used for transmitting the excitation beam which passes through the light-transmissive portion back to the dichroic element, the dichroic element allows the excitation beam to pass therethrough and to be projected to the light integration rod.

16. The illumination system of claim 14, further comprising a color wheel disposed between the light integration rod and the dichroic element.

17. The illumination system of claim 14, further comprising a first lens disposed between the light converging lens and the dichroic element, wherein the conversion beam from the light converging lens becomes a collimation beam after being projected by the first lens.

18. The illumination system of claim 17, further comprising a second lens disposed between the light integration rod and the dichroic element, wherein the conversion beam reflected by the dichroic element is projected by the second lens to the light integration rod.

19. The illumination system of claim 12, wherein the wavelength conversion element has a transmissive wavelength conversion portion and a light-transmissive portion, the transmissive wavelength conversion portion is used for converting the excitation beam into the conversion beam and for configuring the conversion beam to pass therethrough to be transmitted to the light converging lens, the light-transmissive portion is used for configuring the excitation beam to pass therethrough to be transmitted to the light converging lens, and the light converging lens projects the conversion beam and the excitation beam to the light integration rod.

20. The illumination system of claim 19, further comprising a color wheel disposed between the light integration rod and the light converging lens.

21. The illumination system of claim 19, further comprising a first lens disposed between the light converging lens and the light integration rod, wherein the conversion beam from the light converging lens becomes a collimation beam after being projected by the first lens.

22. The illumination system of claim 21, further comprising a second lens disposed between the light integration rod and the first lens, wherein the conversion beam projected by the first lens is projected to the light integration rod via the second lens.

* * * * *